Patented Sept. 30, 1941

2,257,193

UNITED STATES PATENT OFFICE 2,257,193

ALKYLATION PROCESS USING TETRA-PHOSPHORIC ACID

Raphael Rosen, Elizabeth, N. J., assignor to Standard Oil Development Company, a corporation of Delaware No Drawing. Application February 18, 1939, Serial No. 257,225

11 Claims. (Cl. 196—10)

The present invention is directed to the alkylation of aromatic or saturated hydrocarbons having at least one tertiary carbon atom with olefins and in particular to the use of a novel catalyst in carrying out this reaction for the production of highly useful normally liquid hydrocarbons.

It is known that olefinic hydrocarbons, preferably the normally gaseous ones, may be used as alkylating agents for the nuclear alkylation of aromatic hydrocarbons and for the alkylation of saturated alicyclic hydrocarbons containing at least one tertiary carbon atom. Various catalysts have been proposed for carrying out this reaction, namely, boron fluoride, metal halides, such as aluminum halide and iron halide, acid activated clays, concentrated sulfuric acid either used alone or in conjunction with compounds of the fifth group of the periodic system, aluminum halide-alkali metal halide double salt complexes and various other catalysts. Depending upon the particular catalyst employed, temperatures ranging from 0° F. up to and including 400 and 500° F. have been successfully employed. The reaction has been carried out in the liquid as well as the vapor phase. Various promoters have been used in conjunction with the catalysts above mentioned, most notable of which are the alkyl halides.

It has now been found that tetraphosphoric acid, better known under the trade name of "Phospholeum," may be successfully employed as the alkylating catalyst for carrying out the above described types of alkylation reactions. This catalyst is a liquid phosphoric acid comprising a base of ortho-phosphoric acid and containing as much as about 82% to about 84% of $P_2O_5$. This contrasts to a $P_2O_5$ content of about 55% for the ordinary 75% ortho-phosphoric acid of commerce. "Phospholeum" has the advantage that it is a water-white viscous liquid which does not crystallize at a temperature even as low as about −50° C., hence it is particularly adapted for use as a catalyst in alkylation reactions involving room temperature or below. The usual highly concentrated phosphoric acids have the disadvantage of solidifying under such conditions, hence they are not as readily utilizable as a catalyst which maintains fluidity under the conditions of reaction. Phospholeum further has the advantage in that the high $P_2O_5$ content, which makes the acid correspond to the formula $H_6P_4O_{13}$, contains no water except that of chemical combination. Any water formed through the oxidation will react with the $P_2O_5$ to form phosphoric acid and thereby the problem of maintaining acid strength during alkylation is minimized since it has been found that free water in the reaction mixture or formed during the reaction proper is deleterious to the attaining of high yields of alkylated product.

The use of such a catalyst does not limit the reaction conditions within too narrow a limit. The reaction may be carried out in either the liquid or vapor phase although it is preferred to carry out the reaction in the liquid phase since certain advantages accrue by reason of the nature of the catalyst employed. In the case of $C_4$ hydrocarbons, temperatures may range from about 32° F. to about 260° F. but the preferred range is about 90° F. to about 150° F. However, in case of higher hydrocarbons, still higher temperatures may be employed. Sufficient pressure is desirable in order to maintain the hydrocarbons in the liquid phase and to produce a substantially saturated distillate boiling in the gasoline range and having a high octane number. In case of $C_4$ hydrocarbons, pressures of from about 0 to about 30 atmospheres, depending upon the temperature of operation, may be employed. It is preferred, however, to use a temperature of between about 140° F. and 170° F. and under a pressure of about 10 atmospheres.

As has been found the case in previous experiments involving alkylation reactions, it is desirable to maintain a substantial excess of the hydrocarbon containing at least one tertiary carbon atom and to operate using a reaction medium composed predominantly of catalyst plus a large excess of the hydrocarbon to be alkylated. Moreover, excesses of the tertiary carbon atom containing compound, for example, an isoparaffin such as isobutane or isopentane, may range as high as 4 or 5, or even 10 mols per mol of the olefin alkylating reactant which may be isobutylene or other olefin-containing material to be more fully hereinafter described.

As reactants, it is desirable to use isobutane, isopentane and similar low boiling isoparaffins, although higher boiling paraffins of 6 and 7 carbon atoms per molecule may be employed. In fact any paraffinic hydrocarbon of alicyclic nature and having at least one tertiary carbon atom may be employed. As the olefinic reactant, ethylene, propylene, normal butylenes, isobutylene and similar olefinic hydrocarbons may be employed. It is preferred to use those mono-olefins which are normally gaseous since the greatest advantage of the process resides in a conversion of normally gaseous reactants into normally liquid reactants most suitable for motor fuel use. In place of the monomeric mono-olefins above mentioned, it is also within the scope of this invention to employ as the olefinic, or alkylating reactant, polymers, copolymers, interpolymers, crosspolymers, etc. of these mono-olefins, thus di-isobutylene, tri-isobutylene, the codimer of normal butylenes and isobutylene, etc. may be employed as reactants in the present process. Suffice it to say that so long as the feed stock contains at least one isoparaffin containing at least one tertiary carbon atom and boiling below the boiling point of the desired final product, and so long as the feed stock contains at least one mono-olefin, the conditions for the reaction feed stock are met according to the concepts of the present invention.

The process of the present invention may be fully realized in either a batch or continuous operation. Likewise it has been found in the present process as in previous alkylation processes that the more intimate the contact between the feed stock and the catalyst the better the yield of highly saturated product attained. In the case of batch operation, vigorous mechanical stirring or shaking, such as is attained in a bomb, is adequate. In continuous operations the reactants may be placed under sufficient pressure to keep them in the liquid state and then forced continuously thru a dispersion device in the reactor such as jets, porous thimbles, turbo mixers, etc., the product being withdrawn continuously from the top of the reactor. It is also desirable to provide the reactor with a recycle feature wherein the partially converted hydrocarbons mixed with the catalyst are returned thru the jet into the bottom of the reactor. This recycling operation may be repeated until the desired degree of reaction has been attained.

No special type of apparatus is required in carrying out the process of the present invention, any conventional alkylation apparatus being entirely suitable. For example, it is feasible to employ an alkylation unit designed for carrying out an alkylation reaction in the presence of concentrated sulfuric acid for carrying out the process of the present invention. The products of the reaction are run into a settler where the acid is removed and returned to the reactor. The product is treated with caustic or other suitable alkalizing reagents, to remove the traces of acid activator carried over with the product, and subjected to the usual fractionation procedures. Any unreacted reactants may be returned to the feed line to the alkylation unit and, if desired, products boiling above that of the desired final product and emerging from the bottom of a fractionating tower suitably controlled may also be returned to the reactor to suppress their further formation and to improve the yields of the desired product.

The present invention contemplates the use not only of tetraphosphoric acid alone as the catalyst for the alkylation reaction but also includes the use of mixtures of hitherto known alkylating catalysts with tetraphosphoric acid, for example other liquid alkylating catalysts may be advantageously mixed with tetraphosphoric acid to give highly desirable yields of improved octane number gasoline. Thus, concentrated sulfuric acid of 90 to 100% may be employed with the heretofore described tetraphosphoric acid. In the case of solid catalysts, such as clays, they may be activated with tetraphosphoric acid to give beneficial results. Another form in which this catalyst may be used may be attained by coating or impregnating highly porous inert materials, such as kieselguhr, pumice, Celite, fuller's earth, activated carbon, silica gel, super Filtrol, etc., with tetraphosphoric acid and employing said acid carried on such materials as the catalyst for the reaction, either in liquid or vapor phase operation.

The following examples disclose one mode of carrying out the invention but it is not intended that the invention be restricted to these specific examples since the invention is much broader in its application as will be indicated by the appended claims.

Example 1

A feed stock containing 600 cc. of isopentane and 200 cc. of di-isobutylene having a paraffin-olefin ratio of 4:1 was introduced into a reactor containing 400 cc. of tetraphosphoric acid at a temperature of 93° F., the time of addition being about 20 minutes. The reaction mixture was vigorously agitated for a period of 3 hours. A yield of normally liquid hydrocarbon boiling within the gasoline range was obtained in a 90.7% yield based upon the total weight of the olefins in the feed stock. Of this product, the first 24% boiled from 95 to 240° F., the next 17% boiled from 240 to 465° F. and the next 38% boiled from 465 to 468° F. The total product had a bromine number of about 85.

Example 2

In a similar experiment wherein the reaction was carried out at temperatures maintained from 200 to 300° F., and the paraffin-olefin ratio was 2:1, the yield of liquid hydrocarbon boiling within the gasoline range was about 95.5% based upon the total weight of the olefins in the feed stock. This reaction was a vapor phase reaction in contrast to the liquid phase reaction described in Example 1.

It will be obvious to those skilled in the art that various reaction conditions, such as temperature, pressure, thruput, ratio of reactants and catalyst, rate of contacting, etc., may be used, but it is believed to be within the skill of those working in the art to arrive at the optimum conditions for any given feed stock. The above experiments were conducted as batch operation, but it is readily apparent that a recycling in a continuous operation would result in improved yields of high quality gasoline stock. Also, the saturated character of the final product will be increased and the feed rate to the reactor could be materially increased as well in a recycle method where continuous operation is employed.

I claim:

1. A process for the production of normally liquid saturated branched chain hydrocarbons boiling in the gasoline range which comprises condensing a mixture containing at least one paraffin containing at least one tertiary carbon atom with a mono-olefin at a temperature below 260° F. in the presence of a catalyst containing tetraphosphoric acid to directly produce paraffins without a subsequent hydrogenation of the condensation product.

2. A process as in claim 1 wherein the process is carried out continuously under at least sufficient pressure to maintain the reactants in the liquid phase.

3. A process as in claim 1 wherein the catalyst is supported by a carrier.

4. The process for the production of saturated branched chain hydrocarbons boiling chiefly in the gasoline range which comprises condensing isobutane with isobutylene at a temperature between about 32° F. and about 260° F. in the presence of tetraphosphoric acid to directly produce paraffins without a subsequent hydrogenation of the condensation product.

5. A process for the production of saturated branched chain hydrocarbons boiling chiefly in the gasoline range which comprises alkylating isopentane with di-isobutylene at a temperature of about 93° F. in the presence of tetraphosphoric acid.

6. A process as in claim 5 wherein the isopentane is present in substantial molar excess.

7. A process as in claim 5 wherein the tetraphosphoric acid is supported on a carrier.

8. A process for the production of normally liquid saturated branched chain hydrocarbons boiling chiefly in the gasoline range which comprises condensing a mixture containing at least one paraffin containing at least one tertiary carbon atom with a polymer of a mono-olefin monomer at a temperature below 260° F. in the presence of tetraphosphoric acid to directly produce paraffins without a subsequent hydrogenation of the condensation product.

9. A process as in claim 8 wherein the isoparaffins are present in substantial molar excess and the reaction is conducted with vigorous agitation of the reaction mixture.

10. A process as in claim 8 wherein the reaction is carried out at a temperature between about 32° F. and about 260° F.

11. A process as in claim 8 wherein the reaction is carried out in the vapor phase.

RAPHAEL ROSEN.